F. BAILEY & F. H. JACKSON.
APPARATUS FOR STRAINING LIQUIDS.
APPLICATION FILED NOV. 30, 1908.
943,908.
Patented Dec. 21, 1909.
4 SHEETS—SHEET 1.
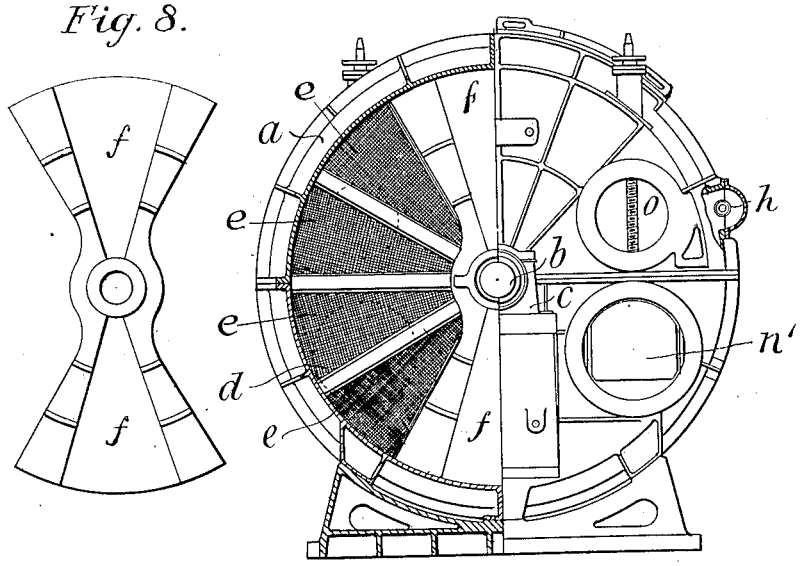
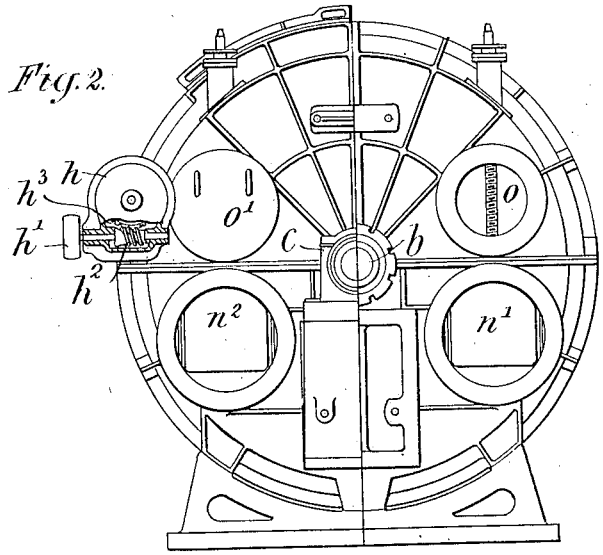
Witnesses:
N. P. Leonard.
M. E. Brauner.
Inventors
Frank Bailey and
Frederick Henry Jackson,
by Byrnes, Townsend & Brickenstein,
Attorneys.

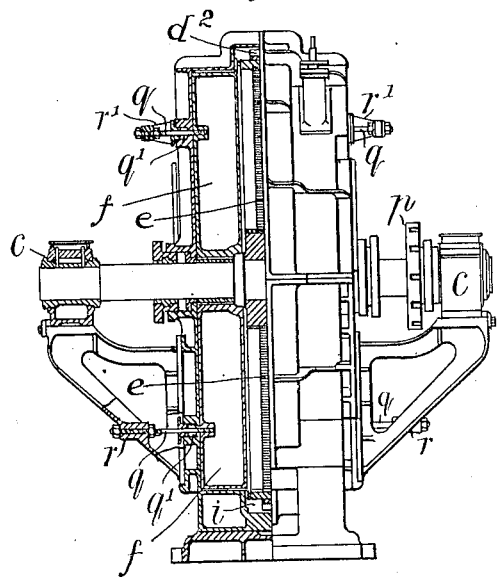
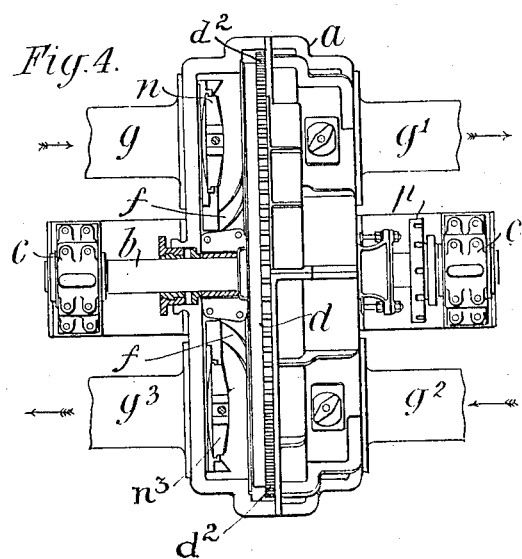

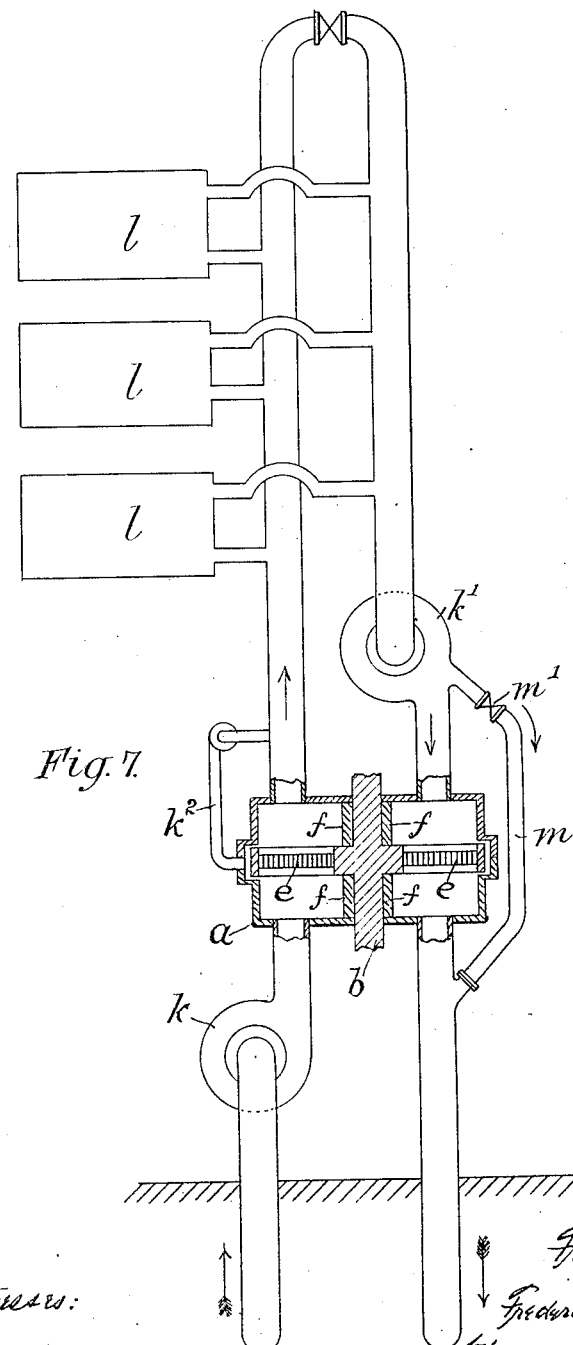

UNITED STATES PATENT OFFICE.

FRANK BAILEY AND FREDERICK HENRY JACKSON, OF BANKSIDE, LONDON, ENGLAND.

APPARATUS FOR STRAINING LIQUIDS.

943,908.    Specification of Letters Patent.    Patented Dec. 21, 1909.

Application filed November 30, 1908. Serial No. 465,204.

*To all whom it may concern:*

Be it known that we, FRANK BAILEY and FREDERICK HENRY JACKSON, subjects of the King of Great Britain and Ireland, and residents of 64 Bankside, in the county of London, England, have invented certain new and useful Improvements in Apparatus for Straining Liquids, of which the following is a specification.

This invention relates to apparatus for use in straining water or other liquid containing solid substances—as for example, river-water containing weeds, straw and the like; the apparatus being constructed and operated in such a manner as to render the straining surfaces self cleansing.

Figure 5:
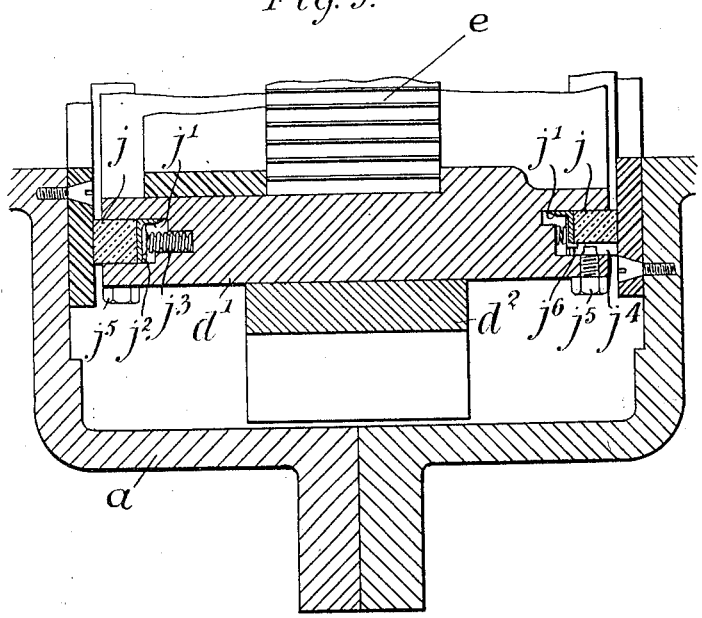
Figure 6:
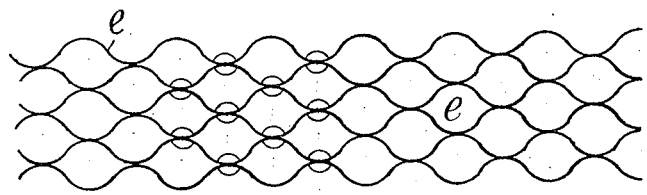

In the accompanying drawings, Figure 1 is a rear elevation, partly in section, of a straining apparatus embodying our improvements, Fig. 2 is a front elevation, Fig. 3 a side elevation, partly in section, and Fig. 4 a plan view, partly in section. Fig. 5 is a detail view to an enlarged scale of a portion of the apparatus while Fig. 6 is an enlarged view of a portion of the strainer grid. Fig. 7 is a plan showing the arrangement of the pumps employed. Fig. 8 shows the shape of one of the partitions.

Apparatus constructed according to our invention and adapted for the purposes above referred to may comprise a casing $a$ which is circular in character and is traversed axially by a horizontal shaft $b$, carried in suitable bearings $c$, $c$. Mounted upon the shaft $b$ is a wheel $d$ provided between its several spokes with removable grids $e$ which serve as strainers. On either side of the wheel, the casing forms a chamber; each of these chambers being in turn divided, by a partition $f$ of considerable width, into two compartments. These partitions $f$ are shown as hollow metal chambers. The casing is thus divided into four compartments, each communicating with one of the pipes $g$, $g'$, $g^2$, $g^3$. The first chamber receives from the pipe $g$ the refuse-charged-water, which, after passing through the straining wheel, reaches the compartment immediately opposite and passes thence through the pipe $g'$, to be applied to such purpose as may be desired. On the water returning, it is led, by the pipe $g^2$, to the fellow compartment on the same side of the casing, and, having passed through the straining wheel in the opposite direction, reaches the compartment immediately opposite, whence, together with the solid matter previously separated out and temporarily retained upon the straining surface, it is returned, by way of the pipe $g^3$, to its original source, or is otherwise disposed of. The passage of liquid between each of the pipes $g$, $g'$, $g^2$, $g^3$ and the casing $a$ is adapted to be controlled by means of the valves $n$, $n'$, $n^2$, $n^3$ and above each valve is a hole $o$ provided with a cover plate $o'$. The rim $d'$, of the wheel $d$, may be furnished with a circular rack $d^2$, whereby, with the aid of suitable driving mechanism, such as the pinion $h$ which is driven by the pulley $h'$ through the worm $h^2$ and worm-wheel $h^3$, a slow rotative movement is imparted to the said wheel $d$.

The grids or straining media $e$, $e$, may be of any suitable construction; but we prefer to construct them of corrugated plates, arranged ridge to ridge and riveted or otherwise fastened together; as shown in Fig. 6.

To provide against the wheel $d$ becoming choked or jammed owing to foreign substances getting between its rim and the casing, we form an annular chamber $i$ in the casing $a$ about the periphery of the wheel, and we maintain this chamber charged with water under a pressure in excess of that of the water on either the "flow" or the "return" side of the straining wheel. In order to prevent loss of pressure by leakage, each face of the rim $d'$ or of the chamber $i$ is furnished with packing of a suitable description. Such packing may assume a tri-part character, as shown in Fig. 5, and comprise a ring $j$ composed of gun-metal, backed by one $j'$ formed of leather, the latter being in turn supported by a metal ring $j^2$ furnished with springs $j^3$ for maintaining a sufficiently water-tight joint between the face of the wheel and that of the casing. In order to prevent movement of the packing with relation to the wheel, the ring $j$ is provided with slots $j^4$ which are engaged by the ends of the set screws $j^5$ and also by the portions $j^6$ of the ring $j^2$. The slots $j^4$ also serve to admit the liquid from the chamber $i$ to the rear of the packing. The peripheral chamber $i$ may, if preferred, be charged with oil or fluid of a viscid character as compared with water. The leakage, if any, from this chamber $i$ is toward the axis of the straining wheel and tends to drive back any foreign substance, grit or the like, which may seek to escape between the faces of the wheel and of the casing and to cause undue friction and wear.

We prefer to make the partitions $f, f$ (see Figs. 3 and 8) between the compartments, of such a width as to extend over at least two of the grids $e$ carried by the straining wheel, such an arrangement tending to diminish leakage between these parts, and in order to admit of the partitions being rotated if it should be necessary to free them, they are mounted on the shaft $b$ which has secured to it at one end the disk $p$ provided at its periphery with slots for the reception of a bar or lever. The partitions are adapted to be adjusted with relation to the wheel by means of the studs $q$ passing through stuffing boxes $q'$ and secured by nuts to the brackets $r, r'$.

In straining water for use in surface condensers, it has been the practice to employ a centrifugal pump to force the water through the strainer through the condenser or condensers and back again through the strainer with the object of freeing the straining grid from the solid substances previously arrested thereby. Under such conditions of working there is a considerable difference of pressure between that in the compartment to which the water first gains access and that in the compartment which it ultimately leaves on the completion of its service; such difference of pressure causing leakage of water from the one compartment direct to the other without passing through the condenser or condensers. In order to minimize this tendency to leakage, the pumping power, instead of being applied at one point, is, as illustrated in Fig. 7, applied at two points $k, k'$; these being on opposite sides of the condenser $l$, and preferably on opposite sides of the strainer $a$, the water flowing in the direction indicated by the arrows. Under such circumstances the pressures respectively prevailing in the first and last compartments of the strainer are equalized or approximately equalized; the duty of the one pump ($k$) consisting primarily in overcoming the resistance of the strainer, while the other pump ($k'$) is principally engaged in overcoming the resistance presented by the condenser or condensers $l$.

For the purpose of freeing the straining grid from the solid substances deposited thereon, it is only necessary for a portion of the water strained to be returned through the said grid, while the remainder may be discharged through a by-pass pipe $m$ furnished with a controlling valve $m'$. By suitably adjusting this valve, such proportion of the water as may be necessary for cleansing the grid is caused to return through the strainer, while the remainder is free to escape with less resistance through the by-pass pipe $m$. A further advantage resulting from such an arrangement is that it is rendered possible for any solid impurities which may have found their way through the strainer $a$ to escape with the return-flow water without again traversing the straining chamber.

Although leakage past the straining grid may be reduced by making the rim $d'$ of the strainer-wheel $d$ a close fit in its casing, this is not practicable where the water is charged with much grit and we prefer to employ means for preventing the passage of grit between the rim $d'$ of the strainer-wheel and the casing $a$. With this object, we force water into the annular chamber $i$ which surrounds the strainer-wheel-rim $d'$, this chamber being maintained at a pressure higher than that prevailing either in the inlet or in the outlet chamber of the apparatus. Under these circumstances, a flow of water in an outward direction is maintained and the passage of grit-charged water in the opposite direction resisted. The water for performing the function here described may be drawn from an independent supply; but we prefer to employ a portion of the water which has passed through the strainer and has been freed from its principal solid contents; a small but independent pump $k^2$ being employed to impart the necessary pressure.

What we claim as our invention and desire to secure by Letters Patent is:—

1. In a self-cleansing strainer apparatus, the combination with a casing, of partitions in said casing dividing the interior thereof into two compartments, and movable screening mechanism arranged to move between the partitions from one compartment to the other, said casing having exit and inlet openings into each compartment, and pumps connected to each of the inlets.

2. In a self-cleansing strainer apparatus, the combination with a casing, of partitions in said casing dividing the interior thereof into two compartments, a movable screening mechanism arranged to move between the partitions from one compartment to the other, an annular chamber formed in said casing into which the rim of the movable screening device projects, exit and inlet openings into each compartment of the casing, pumps connected to each of the inlets, and a third pump connected to deliver water to said annular chamber.

3. In a self-cleansing strainer apparatus, the combination with a casing, of partitions in said casing dividing the interior thereof into two compartments, a movable screening mechanism arranged to move between the partitions from one compartment to the other, inlet and exit tubes connected to each compartment, and a bypass conduit arranged to connect the inlet and delivery pipes of the second compartment.

4. In a self-cleansing strainer apparatus, the combination with a casing, of partitions in said casing dividing the interior thereof into two compartments, and movable screening mechanism arranged to move between the partitions from one compartment to the other, said casing having exit and inlet openings into each compartment, and pumps arranged to deliver water in opposite directions connected to the casing on opposite sides of the partitions, whereby the pressure in the two compartments is equalized.

5. In a self-cleansing strainer, the combination with a casing, means for dividing the casing into two compartments, movable screening mechanism constructed and arranged to move from one compartment to the other, inlets and outlets in the casing into each compartment, and pumps connected to the casing on opposite sides of the dividing means and arranged to deliver water in opposite directions, whereby the pressure in the two compartments is equalized.

In testimony whereof we have signed our names to this specification in the presence of two subscribing witnesses.

FRANK BAILEY.
FREDERICK HENRY JACKSON.

Witnesses:
EDWARD HAY,
BERTRAM MARTIN.